Figure 1:
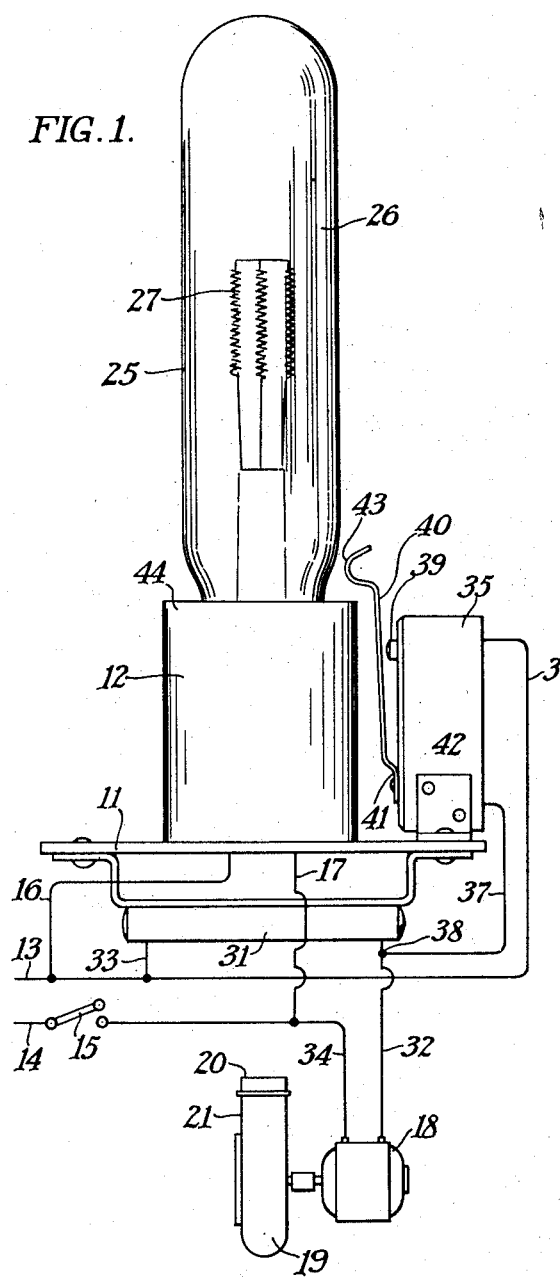

April 6, 1943.  D. L. BABCOCK  2,315,919
MOTOR CONTROL FOR PROJECTORS
Filed April 2, 1942

DAVID L. BABCOCK
INVENTOR
BY Newton M. Perrins
J. Griffin Little
ATTORNEYS

Patented Apr. 6, 1943

2,315,919

UNITED STATES PATENT OFFICE 2,315,919

MOTOR CONTROL FOR PROJECTORS

David L. Babcock, Rochester, N. Y., assignor to Eastman Kodak Company, Rochester, N. Y., a corporation of New Jersey Application April 2, 1942, Serial No. 437,352

7 Claims. (Cl. 176—10)

The present invention relates to projectors, and more particularly to a control of cooling fan motor.

As is well known in the art, the projection lamp or light source of the projector emits heat rays which are detrimental not only to the sensitized image being projected, but also to various parts and mechanisms of the projector itself. In order to overcome this heating effect, many projectors are provided with fans adapted to supply streams of cooling air at the points desired. Such fans are used in connection with a constant speed motor or other similar driving means so that only a definite or limited volume of cooling air is available. Such an arrangement is satisfactory when designed in relation to a lamp of specific or known wattage. However, it is often desirable to replace such a lamp with one of higher wattage. Obviously, in such a case, constantly driven fan is no longer able to deliver a sufficient volume of cooling air to compensate effectively for the increased heat emitted by the larger or higher wattage lamps. The result is that image area, as well as the various projector parts or mechanism may be seriously damaged.

In order to overcome this effect, the present invention provides a cooling fan motor the speed of which may be varied to suit the particular projecting lamp being used so as to insure an adequate volume of cooling air. This change in motor speed is controlled by the insertion in or removal of a resistance in the motor circuit. The changing of this resistance is automatically performed by the mere placing of the desired lamp into its socket so that the user need not concern himself with the making of any adjustment to vary the motor speed.

The present invention has, therefore, as its principal object, a motor speed control device which is actuated by the projection lamp.

A further object of the invention is a speed control device which is moved automatically to the proper position by the positioning of the projection lamp in its socket.

A still further object of the invention is the provision of a speed control device which is simple, effective, and automatic in its operation.

To these and other ends, the invention resides in certain improvements and combinations of parts, all as will be hereinafter more fully described, the novel features being pointed out in the claims at the end of the specification.

Figure 2:
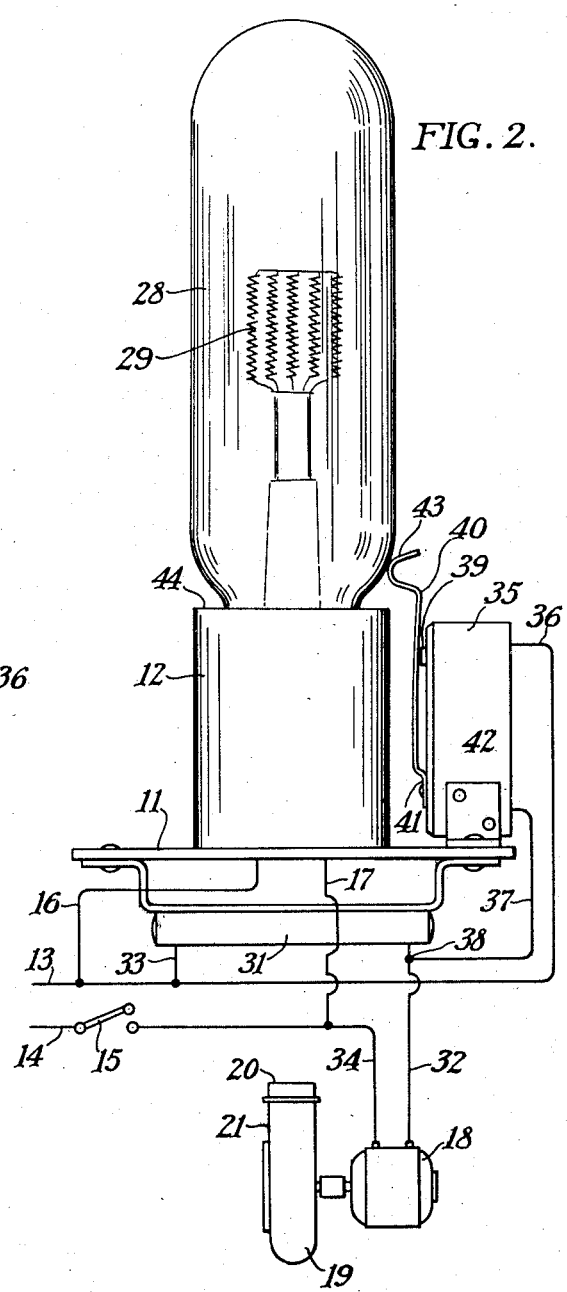

In the drawing:

Fig. 1 is a side elevation view of a portion of the projector, showing the relation of the speed control means of the present invention thereto, and the position of the parts of the control means when one wattage lamp is used; and Fig. 2 is a view similar to Fig. 1 showing the position of the parts of the speed control device when a lamp of a higher wattage is used.

Similar reference numerals throughout the various views indicate the same parts.

As the projector as a whole does not form a part of the present invention, only so much thereof will be shown as is necessary to a full understanding of the speed control means of the present invention. The remaining parts of the projector may be of a standard or suitable construction.

Referring now to the drawing there is shown a support 11 on which the lamp socket 12 of any suitable and well-known construction is mounted. A pair of lead-in wires 13 and 14 may be connected to a suitable source of electric power, the line 14 may be provided with a main switch 15 inserted therein, as clearly shown in the drawing. A pair of wires 16 and 17 electrically connect the socket 12 with the lead-in wires 13 and 14 respectively so that when a projecting lamp is inserted in the socket 12 and the switch 15 closed, the projection lamp will be lighted, as will be readily apparent to those in the art. An electric motor 18 is connected, in a manner to be later described, to the lead-in wires 13 and 14 so that the motor may be energized to drive the rotor of a blower or fan, generally indicated by the numeral 19. The discharge 20 of the fan housing 21 may be connected to the various parts of the projector which are to be cooled.

The socket 12 is adapted to receive projection lamps, generally shown at 25, of different wattages, the lamp shown in Fig. 1 being a 500-watt lamp while the lamp shown in Fig. 2 being a 750-watt lamp. Each of these lamps have a base portion, not shown, arranged to engage in the socket 12 and to make electrical contact with the wires 16 and 17 to energize the lamp filament, as is well known. The 500-watt lamp shown in Fig. 1 has a glass portion 26 adapted to enclose the filament portion 27 of the lamp, while the 750-watt lamp, shown in Fig. 2, has a glass portion 28 adapted to enclose a filament portion 29 thereof. The glass portions 26 and 28 are of equal height but are of unequal diameter, the higher wattage lamp being of larger diameter as will be apparent from an inspection of Figs. 1 and 2. This difference in diameter is utilized to control the speed changing device of the motor 18, as will be later described.

In order that the speed of the motor 18, and hence the fan 19, may be varied, the present invention provides a resistor 31 which is positioned in series with the motor 18. To secure this result, one side of the motor is connected by the wire 32 to one end of the resistor 31 while the other end of the latter is connected by the wire 33 to the lead-in wire 13, the other side of the motor being connected by the wire 34 to the switch 15 and hence the leading wire 14. It will now be apparent that when the switch 15 is closed, the motor 18 and the resistor 31 will be connected in series as well as to the lead-in wires 13 and 14 through the wires 34, 32, and 33, and the motor will be driven at a definite speed. This speed is sufficient to supply the necessary volume of cooling air when the lower or 500-watt lamp is used, as shown in Fig. 1.

A self-opening micro-switch 35 is mounted on the support 11 adjacent the socket 12, has one side thereof connected through the wire 36 to the lead-in wire 13 while the other side is connected through the wire 37 to the wire 32 at the point 38 adjacent the resistor 31. The switch 35 is thus shunted across or is in parallel relation with the resistor 31. The switch 35 is provided with a protruding button 39 by which the switch 35 may be closed. A cantilever spring arm 40 has one end 41 thereof anchored to the case 42 of the micro-switch 35 while the other or free end is formed with a curved portion 43 adapted to extend over the top 44 of the socket 12, as shown in Fig. 1.

The spring 40 has sufficient natural resiliency to normally maintain it out of contact with the button 39 when the 500-watt lamp is used, as shown in Fig. 1. In this position, the switch 35 is open, and resistor 31 is connected in series with the motor 18. The latter, and hence the fan 19, will then rotate at a speed sufficient to limit the volume of air necessary to carry away the heat rays emitted by the 500-watt lamp. However, when the 500-watt lamp is replaced by a higher wattage lamp, such as a 750-watt lamp, as shown in Fig. 2, it is necessary to increase the speed of the motor 18 and fan 19 so that an additional supply of cooling air may be supplied.

This increase in fan speed may be secured by merely moving the spring 40 to the right, as shown in Fig. 2, to also move the button 39 of the switch 35 to the right to close the latter. As the switch 35 is shunted across the resistor 31, the closed switch will cut out or short circuit the resistor 31, and thus remove the latter from the circuit of the motor. The circuit will then be from line 14 through switch 15 and line 34 to motor 18, then through lines 32 and 37 and switch 35, and finally through line 36 to the opposite lead-in line 13. It is thus apparent the resistor 31 has been cut out of the motor circuit so that the speed of the latter, as well as the fan 19 will be thereby increased.

The spring 40 may be manually moved from its position shown in Fig. 1 to the position shown in Fig. 2 to close the switch 35 and to thus cut out the resistor 31 to thereby increase the motor speed so that the fan 19 may deliver a larger volume of cooling air. It is desirable, however, to have such movements automatic and controlled and actuated by the projecting lamp itself so that the mere insertion of the larger or 750-watt lamp in the socket 12 will serve to bring the larger glass filament enclosing portion 28 thereof into engagement with and move the spring 40 to switch closing position, thus relieving the operator of the necessity of making any adjustment. To this end, the increased diameter of the glass filament enclosing portion 28 of the 750-watt lamp is utilized to actuate and move the spring 40 to its switch closing position shown in Fig. 2.

It will be apparent from an inspection of Fig. 1 that due to the smaller diameter of the filament enclosing portion 26 of the 500-watt lamp, Fig. 1, the portion 26 will not engage the end 43 of the spring 40 and the switch 35 will be in open position and the resistor 31 will be arranged in series with the motor 18. However, when the 750-watt lamp, Fig. 2, is inserted in socket 12, the larger diameter filament closing portion 28 is such as to bring the portion 28 into engagement with the end 43 of the spring 40 to move the latter to the right to close the switch 35 and to maintain the latter in said closed position so long as the larger lamp is in the socket 12. The closing of the switch 35 shunts or bypasses the resistor 31 to cut the latter out of the circuit of the motor 18 to thus increase the speed of the fan 19 so that the latter may now deliver a larger volume of cooling air to carry away the increased heat emitted by the larger wattage lamps.

Thus the mere insertion of the projection lamp into the socket 12 serves to cut the resistor 13 into or cut it out of the motor circuit to control the motor and fan speeds. This arrangement thus provides two speeds for the motor and fan. This is, however, by way of illustration only, as it is contemplated that a plurality of such resistors and spring operating arms may be provided for use in connection with different wattage lamps having filament enclosing portions of different diameters so that a plurality of motor and fan speeds may be provided, each speed being suited to provide the necessary cooling air for the particular wattage lamp being used. Such an arrangement provides a speed control for the motor and fan, and is automatically adjusted by the mere position or insertion of the projection lamp into the lamp socket.

While one embodiment of the invention has been disclosed, it is to be understood that the inventive idea may be carried out in a number of ways. This application is, therefore, not to be limited to the precise details described, but is intended to cover all variations thereof which fall within the scope of the appended claims.

I claim:

1. In a projector the combination with a lamp socket adapted to receive a projection lamp, a blower for supplying cooling air streams to various parts of said projector, a multi-speed motor for driving said fan, of means insertable in and removable from the circuit of said motor for controlling the speed thereof, and means controlled by the positioning of said lamp in said socket for determining the effect of said means.

2. In a projector, the combination with a blower, a motor for driving said blower, a lamp socket for the selective reception of electric incandescent lamps having filament enclosing portions of different diameters, of a resistor arranged in the circuit of said motor, a switch shunted across said resistor and arranged to be closed to cut said resistor out of said circuit to increase the speed of said motor, and a switch closing member positioned to be engaged and moved to switch closing position by the engagement therewith of a lamp portion of a predetermined diameter when the lamp is positioned in said socket.

3. In a projector, the combination with a blower, a motor for driving said blower, a lamp socket for the selective reception of electric incandescent lamps having filaments enclosing portions of different diameters, of a resistor arranged in the circuit of said motor, a self-opening switch shunted across said resistor, and a switch closing member positioned to be moved to switch closing position by the engagement therewith of a lamp portion of predetermined diameter when the lamp is positioned in said socket.

4. In a projector, the combination with a blower, a motor for driving said blower, a lamp socket for the selective reception of electric incandescent lamps having filament enclosing portions of different diameters, of a resistor arranged in the circuit of said motor, a self-opening switch shunted across said resistor, and a switch closing arm mounted on said projector in position to be engaged and moved to switch closing position by a lamp portion of predetermined diameter when the lamp is inserted in said socket.

5. In a projector, the combination with a blower, a motor for driving said blower, a lamp socket for the selective reception of electric incandescent lamps having filament enclosing portions of different diameters, of a resistor arranged in the circuit of said motor, a self opening switch positioned adjacent said socket and shunted across said resistor, a switch actuating arm carried by said switch and movable to one position to permit said switch to open to cut said resistor into said circuit and movable to another position to close said switch to cut said resistor out of said circuit to increase the speed of said motor, and a part of said arm arranged to overlie said socket and to be so positioned relative thereto so that the positioning in said socket of a lamp with a portion below a predetermined diameter will not bring said last-mentioned portion into engagement with said part so that said switch will remain open and said resistor will be in said circuit, but the positioning in said socket of a lamp having a portion above a definite diameter will bring automatically said last-mentioned portion into engagement with said part to move said arm to said another position to close said switch to cut said resistor out of said circuit to increase the motor speed.

6. In a projector, the combination with a blower, a motor for driving said blower, a lamp socket for the selective reception of electric incandescent lamps having filament enclosing portions of different diameters, of a resistor arranged in the circuit of said motor, a self opening micro-switch shunted across said resistor and adapted to be closed to cut said resistor out of said circuit to increase the speed of said motor, a cantilever spring carried by said switch and normally positioned to permit said switch to open but movable to a position to close said switch to cut out said resistor, and an actuating part of said spring positioned to overlie said socket and in such a relation therewith that the positioning in said socket of a lamp with a portion below a predetermined diameter will fail to bring said last-mentioned portion into engagement with said part and said switch will remain open, but the positioning in said socket of a lamp having a portion above a definite diameter will serve to bring said last-mentioned portion into engagement with said part to move the latter to a position to close said switch to cut said resistor out of said circuit to increase the speed of said motor.

7. In a projector, the combination with a lamp socket, a blower, a motor for driving said blower, of speed control means for said motor, and means for actuating said control means comprising a member movable by engagement therewith of a predetermined diameter filament enclosing portion of an electric incandescent lamp when the latter is positioned in said socket.

DAVID L. BABCOCK.